United States Patent
Chung et al.

(10) Patent No.: US 12,535,423 B2
(45) Date of Patent: Jan. 27, 2026

(54) FOOD DETECTION SYSTEM AND FOOD DETECTION METHOD

(71) Applicant: NATIONAL CHENG KUNG UNIVERSITY, Tainan (TW)

(72) Inventors: Chen-Kuei Chung, Tainan (TW); Chung-Yu Yu, Taichung (TW); Ding-Yan Lin, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 198 days.

(21) Appl. No.: 18/386,163

(22) Filed: Nov. 1, 2023

(65) Prior Publication Data
US 2025/0067677 A1 Feb. 27, 2025

(30) Foreign Application Priority Data
Aug. 25, 2023 (TW) .................. 112132166

(51) Int. Cl.
*G01N 21/65* (2006.01)
*G01N 1/28* (2006.01)
*G01N 33/02* (2006.01)

(52) U.S. Cl.
CPC .......... *G01N 21/658* (2013.01); *G01N 1/286* (2013.01); *G01N 33/02* (2013.01); *G01N 2201/06113* (2013.01)

(58) Field of Classification Search
CPC ...... G01N 21/658; G01N 1/286; G01N 33/02; G01N 2201/06113
See application file for complete search history.

(56) References Cited

FOREIGN PATENT DOCUMENTS

| CN | 101995400 B | | 1/2012 | |
|---|---|---|---|---|
| CN | 104911667 A | * | 9/2015 | |
| CN | 106995930 A | * | 8/2017 | ............. C25D 11/16 |

(Continued)

OTHER PUBLICATIONS

English Translation of "Oceanhood" CN-111735805-A Description (Year: 2020).*

(Continued)

*Primary Examiner* — Dominic J Bologna
*Assistant Examiner* — Akbar H. Rizvi
(74) *Attorney, Agent, or Firm* — GREENBLUM & BERNSTEIN, P.L.C.

(57) ABSTRACT

The present invention provides a food detection system including: an extraction equipment, a liquid to be identified, a laser light source, a Raman spectrometer, and a metal-nanoparticle-free surface-enhanced Raman scattering substrate. Without an addition of metal nanoparticles, the surface-enhanced Raman scattering substrate of the present invention has better stability and reproducibility compared to those traditional surface-enhanced Raman scattering substrate with metal nano particles. The present invention utilizes an anodic aluminum oxide substrate with two-dimensional and three-dimensional cavities, so that the surface-enhanced Raman scattering substrate has high sensitivity, high stability, and high reproducibility, and may therefore shorten the detection time and production cost of food detection. The invention also provides a food detection method using the food detection system, which is cheap, fast, stable and reliable.

9 Claims, 4 Drawing Sheets

(56) References Cited

FOREIGN PATENT DOCUMENTS

| | | | |
|---|---|---|---|
| CN | 106995930 B | 2/2019 | |
| CN | 111735805 A | * 10/2020 | ........... G01N 21/658 |
| CN | 110132935 B | 5/2021 | |
| CN | 116297402 A | 6/2023 | |
| JP | 6807680 B2 | 1/2021 | |
| TW | 201512648 A | * 4/2015 | |
| TW | 202132207 A | 9/2021 | |
| TW | 202225670 A | 7/2022 | |
| WO | WO 2004/085988 A2 | 10/2004 | |

OTHER PUBLICATIONS

English Translation of Yang et al TW-201512648-A Description (Year: 2015).*
English Translation of "Shaanxi" CN-106995930-A Description (Year: 2017).*
Choudhary, R.K., Sreeshma, K.P. & Mishra, P. Effect of Surface Roughness of an Electropolished Aluminum Substrate on the Thickness, Morphology, and Hardness of Aluminum Oxide Coatings Formed During Anodization in Oxalic Acid. J. of Materi Eng and Perform 26, 3614-3620 (Year: 2017).*
English Translation of Hefei CN-104911667-A Description (Year: 2015).*
Office Action issued in TW Patent Application No. 112132166, dated Mar. 5, 2024, along with an English language translation.

* cited by examiner

FOOD DETECTION SYSTEM AND FOOD DETECTION METHOD

CROSS-REFERENCE TO RELATED APPLICATIONS

This application claims the benefit of priority of Taiwan Application Number TW112132166, filed on 25 Aug. 2023, which is herein incorporated by reference in its entirety.

TECHNICAL FILED

The present invention relates to a food detection system and a food detection method, particularly a food detection system and a food detection method comprising a surface-enhanced Raman scattering substrate including an anodic aluminum oxide substrate with two-dimensional and three-dimensional cavities and a metal nano-film on the anodic aluminum oxide substrate.

BACKGROUND

As the focus on food safety gradually increases, the demand for food safety detection is increasing year by year. However, the existing detection methods in the food safety detection market include traditional expensive mass spectrometry, liquid chromatography and the like which are time-consuming and complicated and require columns cleaning and personnel training. No cheaper, faster, more stable and reliable rapid screening test technology is available, and as a result, many food safety detection market needs remain unmet.

Surface-enhanced Raman scattering (SERS) has been widely studied in recent years due to its high sensitivity, non-destructiveness, and ability to directly analyze liquid samples. SERS has been further applied in fields such as agriculture research, food safety, environmental monitoring, biological molecule detection, and medical health, making it a highly promising analytical and detecting tool.

Traditional SERS technique uses silver or gold particles for Raman enhancement. However, metal-nanoparticles are difficult to control, and the shape and gap change after laser illumination. Therefore, traditional SERS substrates exhibit poor reproducibility and uniformity.

Furthermore, SERS detection technology for pesticide is already available for agricultural crops. For example, Taiwan Patent No. M619099 discloses a finished product pesticide detection device, comprising a SERS substrate and a SERS fixing element, wherein the SERS substrate is deposited with a metal nano-layer for attachment of the finished pesticide, and the SERS fixing element fixes the SERS substrate. Nevertheless, there is still no SERS technology for more complex detections such as food detection because the substrate structure of the prior art is limited to pesticide detection and cannot be applied to various food detections.

Additionally, Taiwan Patent No. 1604187 discloses a surface-enhanced Raman spectrum detection method as follows: an extracted and cleaned-up liquid sample is dropped onto a SERS substrate and then its chemical molecules are absorbed into the SERS substrate. Next, an organic solvent with high volatility is dropped onto the SERS substrate with chemical molecules adsorbed, so that the chemical molecules are redissolved in the organic solvent and float off the surface of the SERS substrate. Later, the SERS substrate is illuminated with light to have the organic solvent on the SERS substrate evaporated and the chemical molecules are left to concentrate into a condensed area. The condensed area is then illuminated by a laser light to enhance the bonding between the chemical molecules in the condensed area and the SERS substrate, and finally forms a solid spectrum measurement area. However, this technique requires numerous applications of organic solvents and laser light concentration to enhance the SERS signals, which is time-consuming and much likely to be contaminated during the detection process. In addition, numerous times of concentrations are required in this technology, which results in high error rate and high false negative/false positive rate, making it impossible to be used in detection that requires high complexity or high accuracy.

Anodic aluminum oxide (AAO) is a porous nanomaterial. Compared to using silicon, glass, or polymers as a substrate, the use of AAO eliminates the need for complex and expensive lithography and etching processes for SERS substrates.

On the other hand, according to Taiwan Patent No. 1731600, a SERS substrate prepared from an AAO substrate exhibits enhanced electric fields along the AAO nanopores, which may enhance the sensing capability of the SERS. However, although the SERS substrate comprising an AAO substrate with two-dimensional structure has an enhanced effect, it still has limitations in detecting extremely low concentrations of analytes. Trying to applying it to food detection, which is more complex and requires high accuracy, would face unsolved difficulties, and still no relevant technology has been developed.

Accordingly, there is still a need for a food detection system and a food detection method that need a simpler process, cost less, are faster, and are capable of detecting extremely low concentrations, i.e., having a stronger sensing capability, in order to meet the increasing demand for food safety detection year by year.

SUMMARY

Accordingly, the present invention provides a food detection system in order to provide a food detection method that needs a simpler manufacturing process, costs less, is faster, capable of detecting extremely low concentrations and is not limited to pesticide detection. The SERS substrate used in the manufacturing process is an AAO substrate with two-dimensional and three-dimensional cavities, which is capable of detecting extremely low concentrations, and has high reproducibility and uniformity.

The present invention provides a food detection system, which can be used to achieve food detection that is simpler, faster, costs less, and exhibits lower detection limit concentration. Moreover, the food detection system of the present invention is not limited to pesticide detection, but can be widely applied to various food safety detection.

The food detection system of the present invention comprises: an extraction equipment, a liquid to be identified, a laser light source, a Raman spectrometer, and a metal-nanoparticle-free SERS substrate.

FIG. 1 is a schematic diagram of the food detection system of the present invention: an extract is extracted by means of an extraction solution using an extraction apparatus (not shown), and the extract then is filtered to obtain a liquid to be identified 2. An enhancement solution may be preferably added into the liquid to be identified 2. Next, the liquid to be identified 2 is dropped onto the SERS substrate 3 and illuminated with a laser light source 1, and then measured using a Raman spectrometer 4. Last, the final result is read. The surface morphology of the SERS substrate 3 is shown in a side view schematic diagram of the surface morphology in the circle at the bottom right of FIG. 1, which has a two-dimensional planar surface and a three-dimensional pits structure, and does not contain any metal nanoparticles.

The SERS substrate of the food detection system of the present invention utilizes a metal nano-film instead of metal-nanoparticles to avoid changes in the shape and gap of the metal-nanoparticles after laser illumination, thus improving the reproducibility and uniformity of the SERS substrate.

Moreover, according to the side view schematic diagram of the surface morphology shown in the circle at the bottom right of FIG. 1, the SERS substrate of the food detection system of the present invention is an AAO substrate with two-dimensional and three-dimensional cavities, or nanospikes around nanocavities (not shown), and may obtain a strong sensing capability by the following mechanism: a surface plasmonic resonance is generated after laser light illumination around nanopores or nanocavities covered by metal nano-film, which improves sensitivity to the composition of the analyzed materials and enables SERS sensing by AAO substrate.

Furthermore, by altering the morphology of the nanopores or nanocavities, such as pore widening of the pore gaps or special electrochemical steps to create the nanospikes around the nanocavities, the improved morphology can be used to amplify the magnitude of the Raman signals and allow detection of lower concentrations.

The present invention improves the sensing strength of the SERS substrate by producing the metal-nanoparticle-free AAO substrate with two-dimensional and three-dimensional cavities using a preparation method with special electrochemical processing steps. Specifically, the present invention electrochemically treats an aluminum foil in an electrolyte within a specific temperature range and modifies the surface structure of the aluminum foil to create three-dimensional cavities. The specific temperature range is 15° C. to 25° C., preferably 15° C. to 20° C. Moreover, the present invention obtains an AAO substrate with three-dimensional cavities having nanospikes by special electrochemical processing steps, which enhances the three-dimensionality of the three-dimensional cavities of the AAO substrate and strengthens the Raman signals.

Specifically, an aspect of the present invention provides a food detection system, comprising:
- an extraction equipment, a liquid to be identified, a laser light source, a Raman spectrometer, and a metal-nanoparticle-free SERS substrate; wherein
- the metal-nanoparticle-free SERS substrate, comprises: an AAO substrate with two-dimensional and three-dimensional cavities, and a metal nano-film on the two-dimensional and three-dimensional cavities; wherein the three-dimensional cavities comprise nano-and-micro-scale pits with nanopores, or nanospikes around nanocavities.

The food detection system of the present invention has the laser light source illuminate the liquid to be identified which is dropped onto the metal-nanoparticle-free SERS substrate, and the Raman spectrometer is used to detect Raman spectrum of the liquid to be identified when illuminated by the laser light source.

In some embodiments, the pits of the three-dimensional cavities have an average diameter of 0.1 µm to 5 µm, preferably 0.3 µm to 2 µm, more preferably 0.5 µm to 1.5 µm, so that multi-reflection may occur and may allow more photons to collide inelastically with the probe molecules on the SERS substrate, and thereby amplify Raman signals.

In some embodiments, the AAO substrate has an average roughness of 0.1 µm to 2 µm, preferably 0.4 µm to 1 µm, more preferably 0.8 µm to 1 µm. Compared with substrates with only two-dimensional structure, which would reflect most of the incident light, an AAO substrate with the roughness may increase the inelastic collision of photons with the probe molecules on the SERS substrate, and thereby amplify Raman signals.

In some embodiments, the wavelength of the laser light source is 400 nm to 850 nm, preferably 500 nm to 800 nm, more preferably 532 nm to 785 nm, and thereby makes the detection result clearer.

In some embodiments, the nanopores have an average gap between the nanopores of 10 nm to 300 nm, preferably 10 nm to 100 nm. By pore widening to reduce the average gap between the nanopores, the three-dimensionality of the three-dimensional cavities of the AAO substrate may be enhanced and thereby enhance Raman signals.

In some embodiments, the liquid to be identified further comprises an enhancement solution selected from at least one of a group consisting of aqueous solutions of sodium chloride, lithium chloride, magnesium chloride, and ammonium chloride.

In some embodiments, the food detection system of the present invention further comprises an extraction solution selected from at least one of a group consisting of pure water, acetone, methanol, acetonitrile, n-hexane and acetonitrile solution containing acetic acid; and ma thereby ay enhance signals detected.

In some embodiments, the SERS substrate may have a low detection limit of 10 ppb for lean meat powder. Since the criteria recommended by regulations in Taiwan are less than 10 ppb, the present invention may be used to detect the remains of lean meat powder.

Furthermore, another aspect of the present invention provides a food detection method, as shown in the flow diagram of FIG. 2, comprising:
- (S1) an extraction step: crushing food and extracting it with an extraction solution to obtain an extract;
- (S2) an enhancement step: filtering the extract and then mixing the extract with an enhancement solution to obtain a liquid to be identified;
- (S3) a dropping step: dropping the liquid to be identified onto a metal-nanoparticle-free surface-enhanced Raman scattering substrate;

the metal-nanoparticle-free surface-enhanced Raman scattering substrate comprises: an anodic aluminum oxide substrate with two-dimensional and three-dimensional cavities, and a metal nano-film on the two-dimensional and three-dimensional cavities; the three-dimensional cavities comprise nano-and-micro-scale pits with nanopores, or nanospikes around nanocavities;
- (S4) a laser illumination step: illuminating the liquid to be identified on the metal-nanoparticle-free surface-enhanced Raman scattering substrate using laser light;
- (S5) a result reading step: reading a detection result of Raman spectrometer. Compared to the prior arts that use multiple concentrating steps by organic solvents and laser light to enhance the SERS signals, which results in that the detection process may be time-consuming and much likely to be contaminated, the food detection method of the present invention strengthens the signal by mixing with the enhancement solutions without the need to use the laser light to illuminate and concentrate for several times, which not only greatly reduces the detection time, but also improves the accuracy and avoids contamination.

In some embodiments, the enhancement solution is selected from at least one of a group consisting of aqueous solutions of sodium chloride, lithium chloride, magnesium chloride, and ammonium chloride.

In some embodiments, the extraction solution is selected from at least one of a group consisting of pure water, acetone, methanol, acetonitrile, n-hexane and acetonitrile solution containing acetic acid; as a result, the enhancement effect of the enhanced signals can be improved, making the detection limit and the detection effect more outstanding.

In addition, another aspect of the present invention provides the use of the metal-nanoparticle-free SERS substrate for food detection; utilizing a metal nano-film instead of nanoparticles to avoid changes in the shape and gap of the metal-nanoparticles after laser illumination, thus improving the reproducibility and uniformity of the SERS substrate. Moreover, the SERS substrate of the present invention is an AAO substrate with two-dimensional and three-dimensional cavities, a surface plasmonic resonance is generated after laser light illumination around nanopores covered by metal nano-film. At the same time, the morphology of nanopores can be improved by changing the morphology of nanopores, such as changing the gap and the shape of the nanopores, or generating nanospikes around nanocavities, which can thereby amplify the magnitude of Raman signals and detect a lower concentration. Accordingly, the metal-nanoparticle-free SERS substrate of the present invention can be applied to food detection.

The food detection system and the food detection method of the present invention utilize a metal-nanoparticle-free SERS substrate to avoid changes in the shape and gap of the metal-nanoparticles after laser illumination, and improve the stability, reproducibility, and uniformity of the SERS substrate Accordingly, the stability of the detection system is improved.

The food detection system and the food detection method of the present invention utilize the SERS substrate with two-dimensional and three-dimensional cavities, and a surface plasmonic resonance is generated after laser light illumination around nanopores covered by metal nano-film. At the same time, the morphology of nanopores can be improved by changing the morphology of nanopores, such as changing the gap and the shape of the nanopores, or generating nanospikes around nanocavities, which can thereby amplify the magnitude of Raman signals, and thus solve the disadvantages of the traditional SERS sensing substrates using metal-nanoparticles, such as poor stability and uniformity, and poor sensitivity of two-dimensional AAO substrates. Accordingly, it may shorten the detection time and increase the accuracy of the detection.

The food detection system and the food detection method of the present invention utilize the SERS substrates instead of traditional methods, such as mass spectrometer, etc., to enable rapid production and lower cost. Also, AAO substrates may be disposed of after detection without reuse, and the simple process also has a great advantage for mass detection and increasing the number of samples.

The food detection system and the food detection method of the present invention can also be used for various food detections with high complexity due to the lower detection limit of the SERS substrate.

In addition, with the food detection system and the food detection method of the present invention, multiple extraction and concentration steps using organic solvents and laser light can be omitted because the liquid to be identified contains the enhancement solution. Thus, the process is simplified and the accuracy is improved, as well as the contamination of during food detection is avoided.

DETAILED DESCRIPTION

Figure 1:
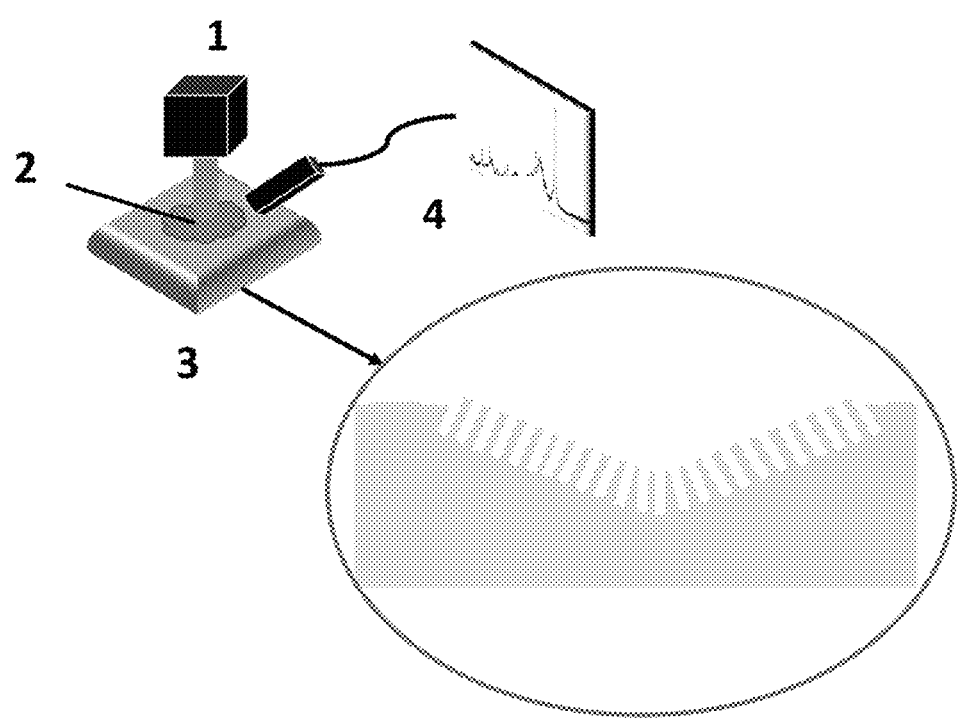
FIG. 1 shows the schematic diagram of the food detection system of the present invention.
Figure 2:
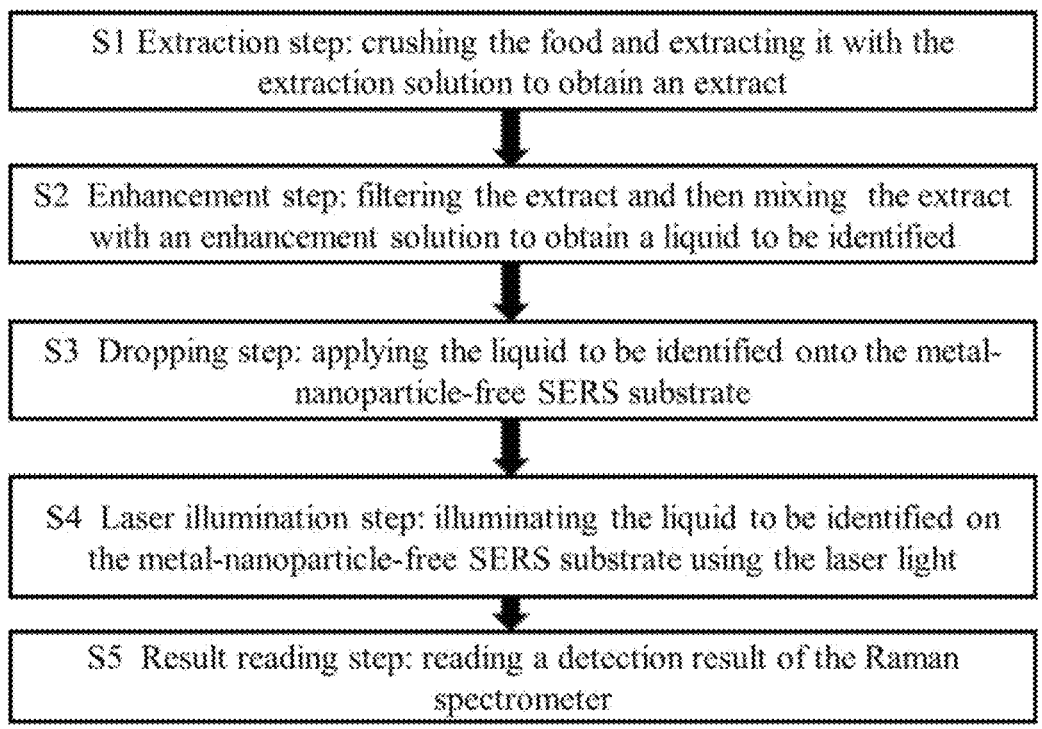
FIG. 2 shows the flow diagram of the food detection method of the present invention.

The present invention will be explained through the following Examples. The Examples of the present invention are only for listing possible embodiments, but not intended to limit the present invention to be implemented in accordance with any specific conditions, applications or specific methods described in the Examples. Thus, the illustration of Examples is only for the purpose of explaining the present invention and not intended to limit the present invention.

EXAMPLES

Example 1

[Preparation of a Metal-Nanoparticle-Free Surface-Enhanced Raman Scattering Substrate]

1. Cleaning Step:

An aluminum foil is ultrasonically cleaned in acetone and deionized water for 5 minutes to remove surface particles and oily dirt, and the surface of the aluminum substrate is rinsed with deionized water, and then blown dry with nitrogen.

2. A First Electrochemical Treatment Step:

The aluminum foil is electrochemically treated at 15° C. to 25° C. by applying 5 V to 40 V DC voltage to the aluminum foil for 5 minutes in a mixed solution consisting of perchloric acid and ethanol (4:1-1:4), so that the aluminum foil with three-dimensional cavity structure is obtained.

3. A Second Electrochemical Treatment Step:

The aluminum foil is secondly electrochemically treated in an electrolyte of 5 wt % phosphoric acid at 0° C. to 40° C. for 180 seconds using hybrid pulse square wave consisting of a positive voltage of 100 V to 200 V and a negative voltage of −2 V to −8 V, where the time ratio of the positive and negative voltage is 1:1-1:4. Then, the porous AAO film is obtained.

4. A Third Electrochemical Treatment Step:

Afterwards, the hybrid pulse square wave is suspended and the reaction continues in the electrolyte for 0 to 60 minutes to obtain an AAO substrate.

5. A Metal Plating Step:

The surface of the AAO substrate is plated with a metal film with a thickness of about 6 nm to 30 nm, and the SERS substrate for SERS sensing is obtained.

In this example, the first electrochemical treatment step is carried out at 15° C. to 25° C. to prepare a three-dimensional cavity structure with nano-and-micro-scale pits with nanopores. In addition, the third electrochemical treatment step is carried out to further adjust the morphology of the AAO substrate with the three-dimensional cavity structure by widening the size of the nanopores therein and decreasing the distance between the nanopores therein, so as to enhance the three-dimensionality of the cavities structure of the AAO substrate to strengthen the Raman signals.

Specifically, Image J software is used to measure the gaps between the nanopores after the pore widening. The gap is defined as the distance between the outermost part of one nanopore to that of another nanopore. The average gap is measured to be 10 nm to 100 nm.

Example 2

[Preparation of a Spike-Type Metal-Nanoparticle-Free Surface-Enhanced Raman Scattering Substrate]

1. Cleaning Step:

An aluminum foil is ultrasonically cleaned in acetone and deionized water for 5 minutes to remove surface particles and oily dirt, and the surface of the aluminum substrate is rinsed with deionized water, and then blown dry with nitrogen.

2. A First Electrochemical Treatment Step:

The aluminum foil is electrochemically treated at −20° C. to 20° C. by applying 5 V to 40 V DC voltage to the aluminum foil for 5 minutes in a mixed solution consisting of perchloric acid and ethanol (4:1-1:4), so that an aluminum foil with an average roughness (Ra) of 0.05 μm to 1 μm is obtained.

3. A Second Electrochemical Treatment Step:

The aluminum foil is secondly electrochemically treated in an electrolyte of 0.1 M to 3 M oxalic acid at 0° C. to 40° C. for 5 minutes using hybrid pulse square wave consisting of a positive voltage of 100 V to 150 V and a negative voltage of −2 V to 8 V, where the time ratio of the positive and negative voltage is 1:1-1:4. Then, an aluminum foil with an AAO film is obtained.

4. A Third Electrochemical Treatment Step:

The aluminum foil with the AAO film is electrochemically treated by applying 120 V to 180 V DC voltage to the aluminum foil for 30 seconds in an electrolyte consisting of perchloric acid and ethanol (4:1-1:4), to separate the AAO film and the aluminum foil and obtain an AAO substrate with three-dimensional spikes.

5. A Metal Plating Step:

The surface of the AAO substrate with three-dimensional spikes is plated with a metal film with a thickness of about 6 nm to 30 nm, and the SERS substrate for SERS sensing is obtained.

In this example, the third electrochemical treatment step is used to obtain an AAO substrate with a three-dimensional cavity structure of nanospikes, which enhances the three-dimensionality of the cavities structure of the AAO substrate, and thus improves the sensing strength of the SERS substrate.

Example 3

[Detection of Lean Meat Powder in Pork]

First, the pork is cooked and crushed, and the extract is extracted with pure water as the extraction solution, according to the standard method published in "Wei Shou Shi Zie No. 1071900960". Next, an enhancement solution of 0.1 wt % sodium chloride in pure water is prepared, and three types of lean meat powder solutions are prepared by adding 10 ppb, 100 ppb, and 1000 ppb of lean meat powder into pure water, respectively.

Then, the extract, the lean meat powder solutions, and the enhancement solution are mixed in a volume ratio of 1:1:2 to obtain the liquid to be identified, wherein three types of the liquid to be identified are prepared based on the three types of lean meat powder solutions. Drop 2 μL of the liquid to be identified onto the metal-nanoparticle-free SERS substrate prepared in Example 1 and let it dry, then use laser light with a wavelength of 532 nm to illuminate the substrate and detect it by Raman spectrometry.

Figure 3:
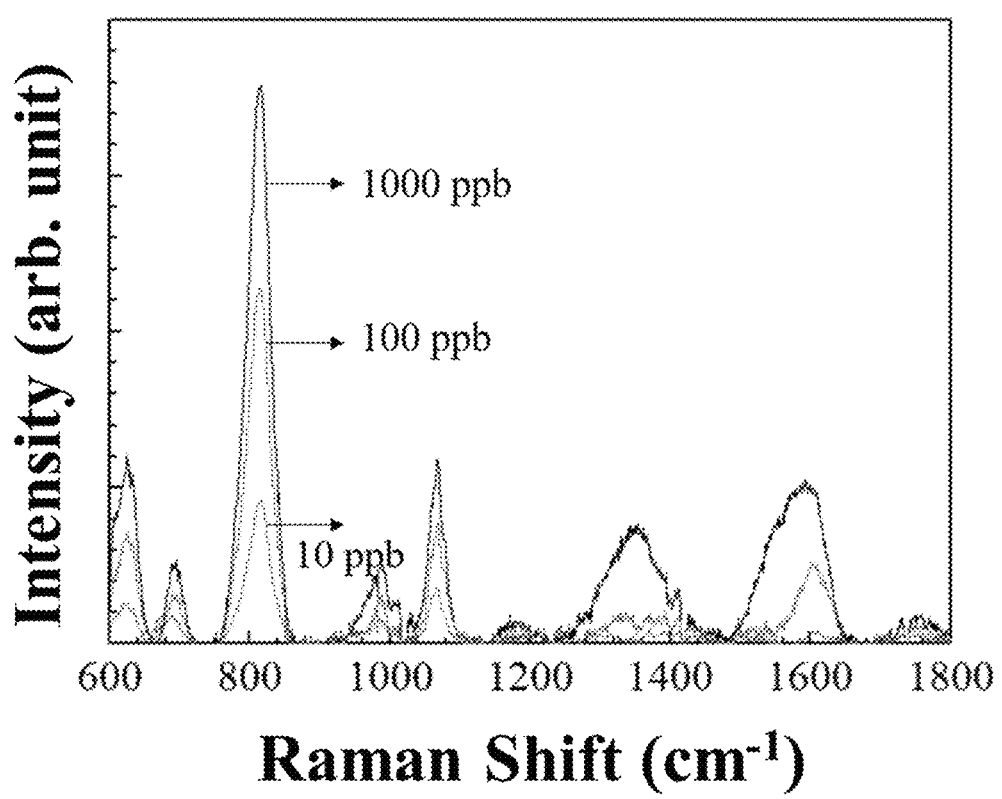
FIG. 3 shows the SERS spectra of lean meat powder.

The Raman spectra is shown in FIG. 3. With the detection method and detection system of the present invention, the detection limit of lean meat powder can be as low as 10 ppb, 100 ppb, and 1000 ppb of added lean meat powder, which is in compliance with the standards stipulated in the regulations of Taiwan.

Example 4

[Detection of Plasticizer Bisphenol A]

1. Detection with Sodium Chloride Added as the Enhancement Solution

Firstly, the plastic food container is heated and bisphenol A is dissolved using acetonitrile. Then, the bisphenol A extract is dissolved by liquid-phase extraction with the extraction solution consisting of acetonitrile and n-hexane-. Subsequently, the extract is filtered through a filter paper to remove the plastic residue and mixed with 1.5 wt % sodium chloride enhancement solution to obtain the liquid to be identified, and the liquid to be identified is dropped onto the metal-nanoparticle-free SERS substrate prepared in Example 1. Next, a laser light with a wavelength of 532 nm is illuminated on the SERS substrate. Finally, Raman spectra of detection results are read.

2. Detection with Lithium Chloride Added as the Enhancement Solution

Firstly, the plastic food container is heated and bisphenol A is dissolved using acetonitrile. Then, the bisphenol A extract is dissolved by liquid-phase extraction with the extraction solution consisting of acetonitrile and n-hexane. Subsequently, the extract is filtered through a filter paper to remove the plastic residue and mixed with 1.5 wt % lithium chloride enhancement solution to obtain the liquid to be identified, and the liquid to be identified is dripped onto the metal-nanoparticle-free SERS substrate prepared in Example 1. Finally, Raman spectra of detection results are read.

3. Detection without Enhancement Solution

Repeat the experimental steps in "1. Detection with Sodium Chloride Added as the Enhancement Solution" and delete the step of mixing the extract with the sodium chloride enhancement solution.

Figure 4:
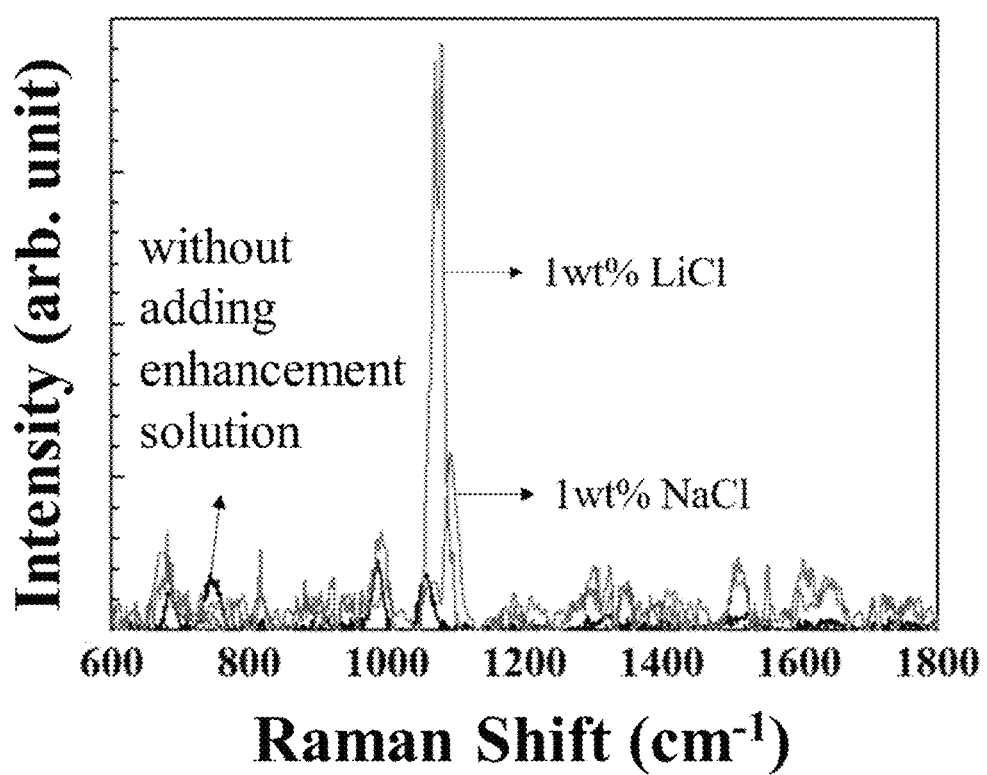
FIG. 4 shows the SERS spectra of plasticizer bisphenol A.

The results of three types of plasticizer bisphenol A detection are shown in FIG. 4. Comparing the results of the three types of plasticizer bisphenol A detection, the results of the detection with the addition of the sodium chloride and lithium chloride enhancement solutions both show that the enhancement solutions help to improve the detection sensitivity. The results also show that the use of lithium chloride as the enhancement solution is more effective. Accordingly, it may be seen that the detection system and detection method of the present invention can effectively detect the plasticizer bisphenol A with different enhancement solutions, and is suitable for application in food safety detection.

What is claimed is:

1. A food detection system, comprising:
an extraction equipment, a liquid to be identified, a laser light source, a Raman spectrometer, and a metal-nanoparticle-free surface-enhanced Raman scattering substrate; wherein
the metal-nanoparticle-free surface-enhanced Raman scattering substrate comprises: an anodic aluminum oxide substrate with two-dimensional and three-dimensional cavities, and a metal nano-film on the two-dimensional and three-dimensional cavities; wherein the three-dimensional cavities comprise nano-and-micro-scale pits with nanopores, and wherein the three-dimensional cavities do not comprise nanospikes around nanocavities;

the laser light source illuminates the liquid to be identified which is dropped onto the metal-nanoparticle-free surface-enhanced Raman scattering substrate; and the Raman spectrometer is used to detect Raman spectrum of the liquid to be identified when illuminated by the laser light source.

2. The food detection system of claim 1, wherein the liquid to be identified further comprises an enhancement solution selected from at least one of a group consisting of aqueous solutions of sodium chloride, lithium chloride, magnesium chloride, and ammonium chloride.

3. The food detection system of claim 1, wherein the system further comprises an extraction solution selected from at least one of a group consisting of pure water, acetone, methanol, acetonitrile, n-hexane and acetonitrile solution containing acetic acid.

4. The food detection system of claim 1, wherein a wavelength of the laser light source is 532 nm to 785 nm.

5. The food detection system of claim 1, wherein the nano-and-micro-scale pits of the three-dimensional cavities have an average diameter of 0.1 μm to 5 μm.

6. The food detection system of claim 1, wherein the anodic aluminum oxide substrate has an average roughness of 0.1 μm to 2 μm.

7. The food detection system of claim 1, wherein the nanopores have an average gap between the nanopores of 10 nm to 300 nm.

8. A food detection method, comprising:
(S1) an extraction step: crushing food and extracting it with an extraction solution to obtain an extract;
(S2) an enhancement step: filtering the extract and then mixing the extract with an enhancement solution to obtain a liquid to be identified;
(S3) a dropping step: dropping the liquid to be identified onto a metal-nanoparticle-free surface-enhanced Raman scattering substrate; wherein
the metal-nanoparticle-free surface-enhanced Raman scattering substrate comprises: an anodic aluminum oxide substrate with two-dimensional and three-dimensional cavities, and a metal nano-film on the two-dimensional and three-dimensional cavities; wherein the three-dimensional cavities comprise nano-and-micro-scale pits with nanopores, and wherein the three-dimensional cavities do not comprise nanospikes around nanocavities;
(S4) a laser illumination step: illuminating the liquid to be identified on the metal-nanoparticle-free surface-enhanced Raman scattering substrate using laser light; and
(S5) a result reading step: reading a detection result of Raman spectrometer.

9. The food detection method of claim 8, wherein the enhancement solution is selected from at least one of a group consisting of aqueous solutions of sodium chloride, lithium chloride, magnesium chloride, and ammonium chloride; and the extraction solution is selected from at least one of a group consisting of pure water, acetone, methanol, acetonitrile, n-hexane and acetonitrile solution containing acetic acid.

* * * * *